United States Patent [19]

Ikado et al.

[11] Patent Number: 5,766,748
[45] Date of Patent: Jun. 16, 1998

[54] STRETCHED FILM OF LACTIC ACID-BASED POLYMER

[75] Inventors: Shuhei Ikado; Takayuki Kuroki, both of Aichi-ken; Masumi Saruwatari, Tokyo; Naoki Kobayashi, Aichi-ken; Kazuhiko Suzuki, Kanagawa-ken; Hirotaka Wanibe, Aichi-ken, all of Japan

[73] Assignee: Mitsui Chemicals, Inc., Chiyoda-ku, Japan

[21] Appl. No.: 754,260

[22] Filed: Nov. 20, 1996

[30] Foreign Application Priority Data

Nov. 30, 1995 [JP] Japan .................................. 7-311920

[51] Int. Cl.$^6$ .................................. B32B 5/16; B32B 27/36
[52] U.S. Cl. .................................. 428/220; 428/328; 428/330; 428/331; 428/480; 428/910; 524/423; 524/425; 524/447; 524/451; 524/492; 524/493; 524/497
[58] Field of Search .................................. 428/219, 220, 428/328, 330, 331, 480, 910; 524/423, 425, 447, 451, 492, 493, 497

[56] References Cited

FOREIGN PATENT DOCUMENTS

| 0510998 | 10/1992 | European Pat. Off. . |
|---|---|---|
| 5-42786 | 2/1993 | Japan . |
| 5-70696 | 3/1993 | Japan . |
| 6-340753 | 12/1994 | Japan . |
| WO90/01521 | 2/1990 | WIPO . |
| WO92/01548 | 2/1992 | WIPO . |

*Primary Examiner*—D. S. Nakarani
*Attorney, Agent, or Firm*—Burns, Doane, Swecker & Mathis, L.L.P.

[57] ABSTRACT

The stretched film of the lactic acid-based polymer of the invention can degrade under natural environment, and additionally has an excellent mechanical strength and durability. By use of a lubricant in combination with an inorganic filler, these properties are further improved and thickness accuracy is enhanced. Consequently, the stretched film of the lactic acid-based polymer of the invention can be widely applied to a prepaid card and other various film materials, lamination materials and packaging materials. Even though abandoned after use in the natural environment, the stretched film relatively quickly decomposes into carbon dioxide and water and does not accumulate as waste.

13 Claims, No Drawings

STRETCHED FILM OF LACTIC ACID-BASED POLYMER

BACKGROUND OF THE INVENTION AND RELATED ART

1. Field of the Invention

The present invention relates to a stretched film of a lactic acid-based polymer, and more specifically relates to a stretched film of a lactic acid-based polymer which has degradability in the natural environment and is excellent in stretchability, mechanical strength, durability and thickness accuracy.

2. Related Art

Waste plastics have created problems in recent years. Waste plastics such as packaging materials and throwaway cards have been abandoned and disposed by incineration or burial in a landfill. However, in the case of incineration disposal, these waste plastics generate high combustion heat and lead to a durability problem for the incinerator. Further, polyvinyl chloride waste evolves toxic gas upon incineration and causes an environmental pollution issue. In the case of landfill disposal, shaped plastics do not degrade and semipermanently remain as refuse just as they are. Thus, the adverse effect of these waste materials leads to a serious problem on the natural environment.

In such circumstances, various degradable plastics which can be completely consumed by microorganisms under natural environment and decomposed into natural by-products, carbon dioxide and water, have been invented and are now on the available stage.

Japanese Laid-Open Patent Hei 6-340753 has disclosed that a composition consisting of thermoplastic polymer which comprises as a principal ingredient polylactic acid or a copolymer of lactic acid with other hydroxycarboxylic acids, can be used for, for example, a degradable card and the card has high mechanical strength and durability for repeated use.

On the other hand, WO 90/01521 has described that properties of plastics such as hardness, strength and temperature resistance can be changed by addition of silica, kaolinite and other inorganic compounds to lactide thermoplastics. Further, Japanese WO 92/01548 has disclosed a process for biaxially stretching a polylactic acid based film.

However, it has been difficult to improve stretching ability of a film and mechanical strength and evenness of the resulting biaxially stretched film by mere addition of inorganic fillers to polylactic acid or a copolymer of lactic acid with other hydroxycarboxylic acids.

That is, depending upon the kind of usually applied inorganic fillers, the lactic-acid based polymer film has poor stretchability, generates break, and remarkably lowers productivity. Even though the film can be stretched, the resultant film has poor accuracy of thickness, has large variation of mechanical strengths such as tensile strength and repeated strength such as folding endurance. Thus, satisfactory product in industry could not be obtained from the film.

SUMMARY OF THE INVENTION

In view of the above situation, one object of the invention is to provide a stretched film of a lactic acid-based polymer which maintains the same level as conventional films in the degradability in the natural environment and had an improved level in stretching ability, mechanical strengths, durability and thickness accuracy.

As a result of an intensive-investigation upon polylactic acid and copolymers of lactic acid and other hydroxycarboxylic acids, the present inventors have found that a stretched film of a lactic acid-based polymer which maintains the same level as conventional films in the degradability in the natural environment and has a improved level in stretching ability, mechanical strengths, durability and thickness accuracy, can be obtained by addition of a specific amount of a specific kind of inorganic filler having a specific particle size and further in combination with a lubricant, when necessary, to polylactic acid or a copolymer of lactic acid with other hydroxycarboxylic acids. Thus, the present invention has been completed.

That is, one aspect of the invention is a stretched film of lactic acid-based polymer which comprises 3 to 25 parts by weight of one or more inorganic fillers selected from the group consisting of titanium oxide having an average particle size of 0.1 to 0.5 µm, calcium carbonate having an average particle size of 0.3 to 6 µm, barium sulfate having an average particle size of 0.1 to 2 µm, silica having an average particle size of 1 to 12 µm, kaolin having an average particle size of 0.5 to 10 µm and talc having an average particle size of 0.1 to 10 µm for 100 parts by weight of polylactic acid or a copolymer of lactic acid with other hydroxycarboxylic acid, and which is stretched 1.3 to 5 times to one or more directions. The stretched film of lactic acid-base polymer in the invention preferably comprises a lubricant in combination.

The stretched film of lactic acid-based polymer in the invention comprises a specific amount of a strictly selected kind of inorganic filler having a specific particle size and also comprises, when necessary, a specific amount of lubricant. Consequently, the stretched film has an excellent mechanical strengths, durability and thickness accuracy, and specifically has a strong durability of 900 times or more in folding endurance. When the lubricant is used, a high accuracy of thickness having 1.3% or less in the variation coefficient can be obtained. Consequently, the stretched film of lactic acid-based polymer in the invention can be suitably applied to various kinds of film materials, lamination materials and package materials.

Particularly, the stretched film is suited for the material of a prepaid card which requires strong durability and high thickness accuracy. Further, the degradability under natural environment is equal to that of the conventionally known polylactic-based polymer. Thus, even though abandoned after use in the natural environment, the film decomposes relatively quickly into carbon dioxide and water and does not accumulate as waste.

DETAILED DESCRIPTION OF PREFERRED EMBODIMENTS

In the process of the invention, a composition is prepared by addition and mixing of a specific inorganic filler and a specific amount of lubricant, when necessary, to polylactic acid or a copolymer of lactic acid with other hydroxycarboxylic acid, the composition is processed into a film, for example, by using an extruder or other processing equipment, and the resulting film is stretched specific times in one or more directions to provide the stretched film of lactic acid-based polymer in the invention. The invention will hereinafter be illustrated in detail.

In polylactic acid and a copolymer of lactic acid with other hydroxycarboxylic acid in the invention (hereinafter referred to simply as lactic acid-based polymer), polylactic acid includes poly(L-lactic acid) where the constitutional units consist of L-lactic acid alone, poly(D-lactic acid) which consists of D-lactic acid alone, and poly(D,L-lactic acid) where L-lactic acid units and D-lactic acid units constitute various proportions.

Exemplary hydroxycarboxylic acid other than lactic acid in the invention include glycolic acid, 3-hydroxybutyric acid, 4-hydroxybutyric acid, 4-hydroxyvaleric acid, 5-hydroxyvaleric acid and 6-hydroxycaproic acid. Particularly, glycolic acid is preferred in these hydroxycarboxylic acids.

The above lactic acid-based polymer can be obtained by selecting the required raw material monomer and comonomer from L-lactic acid, D-lactic acid and hydroxycarboxylic acid other than lactic acid and carrying out direct dehydration polycondensation. Alternatively, the lactic acid-based polymer can be obtained by ring-opening polymerization of lactide which is a cyclic dimer of lactic acid, glycolide which is a cyclic dimer of glycolic acid, and cyclic esters such as caprolactone, propiolactone, butyrolactone and valerolactone. However, in the case of manufacture in industry, the lactic acid-based polymer is preferably produced by direct dehydration polycondensation in view of cost reduction and simplifying the process.

In the case of preparing the polymer by the direct dehydration polycondensation process, lactic acid or lactic acid and other hydroxycarboxylic acid are subjected to azeotropic dehydration condensation preferably in the presence of an organic solvent, a diphenyl ether-based solvent in particular. The polymerization reaction more preferably progresses by removing water from the azeotropically distilled solvent and returning of substantially anhydrous solvent to the reaction system. The lactic acid-based polymer thus obtained has sufficiently high molecular weight and strength which are suitable for use in the invention.

The molecular weight of lactic acid-based polymer has an effect on the processing ability, strength and degradability of the stretched film in the invention. Low molecular weight leads to low strength of the stretched film obtained and the film sometimes breaks by tension in use.

Low molecular weight also accelerates degradation. On the other hand, high molecular weight leads to reduction of processing ability and film preparation becomes difficult. In view of these circumstances, the weight average molecular weight of lactic acid-based polymer used in the invention is preferably in the range of 10,000 to 1,000,000, more preferably 100,000 to 300,000.

When a copolymer of lactic acid with other hydroxycarboxylic acid is used in the invention, the content of lactic acid units in the copolymer influences the degradability of the film and thus a copolymer comprising 40% by mol or more lactic acid units is preferably used.

When the copolymer of lactic acid with other hydroxycarboxylic acid consists of lactic acid units and glycolic acid units, the content of lactic acid units in the copolymer is more preferably 70% by mol or more. When the copolymer consists of lactic acid units and 6-hydroxycarboxylic acid units, the content of lactic acid units in the copolymer is more preferably 40 to 70% by mol.

A restricted kind of inorganic fillers can be used for the invention. Specific fillers are 6 inorganic compounds and include titanium oxide, calcium carbonate, barium sulfate, silica, kaolin and talc. These fillers can be used singly or as a mixture. In these fillers, titanium oxide is most preferred in view of folding endurance, mechanical strengths and variation coefficient of thickness. The composition obtained by blending these inorganic fillers with the lactic acid-based polymer has good biaxial stretching ability and thus can improve mechanical strengths such as tensile strength and durability such as folding endurance which are required for the stretched film.

The blending amount of the inorganic filler for the lactic acid-base polymer is generally 3 to 25 parts by weight, preferably 5 to 25 parts by weight for 100 parts by weight of the lactic acid-based polymer. When the blending amount is less than 3 parts by weight, sufficient durability which is the object of the invention cannot be attained. On the other hand, an amount exceeding 25 parts by weight leads to inferior biaxial stretching ability and also lowers mechanical strengths.

Titanium oxide which can be used in the invention is divided into three groups, that is, anatase-type, rutile-type and brookite-type on the basis of crystal form. Any type of titanium oxide can be used and had a n average particle size of preferably 0.1 to 0.5 μm and more preferably 0.1 to 0.3 μm. In order to enhance dispersibility in the lactic acid-based polymer, titanium oxide can be coated on the surface with alumina, silica, zinc oxide and other metal oxides or can be treated on the surface with aliphatic polyol. Marketed titanium oxide include TIPAQUE (manufactured by Ishihara Sangyo Co. Ltd.) and TITONE (manufactured by Sakai Chemical Ind. Co. Ltd.).

Calcium carbonate can be used in any crystal forms, calcite, aragonite and vaterite. An average particle size of 0.3 to 6 μm is preferably used. Marketed calcium carbonate includes NCC (manufactured by Nitto Funka Kogyo KK) and SUNLIGHT (manufactured by Takehara Kagaku Kogyo Co. Ltd.).

Barium sulfate which can be used is precipitated barium sulfate prepared through chemical reaction from barite and has an average particle size of 0.1 to 2 μm. Marketed barium sulfate includes BARIUM SULFATE precipitated TH and BARIUM SULFATE precipitated ST (manufactured by Barium Chemical Co. Ltd.).

Silica is natural or synthetic silicic acid and an average particle size of 1 to 12 μm is preferably used. Marketed silica includes SYLYSIA (manufactured by Fuji Silysia Chemical Ltd.), FUSELEX CRYSTALITE (manufactured by Tatsumori Ltd.).

Kaolin is naturally produced aluminum silicate hydrate and had an average particle size of 0.5 to 10 μm. Calcined type obtained by removing crystallization water can also be used. Marketed kaolin includes NN KAOLIN CLAY (manufactured by Tsuchiya Kaolin Industry Ltd.) and ASP, SATINTONE (manufactured by Engelhard Co.).

Talc is naturally produced magnesium silicate hydrate and has an average particle size of 0.1 to 10 μm. Marketed talc includes PK, LMS (manufactured by Fuji Talc Industrial Co. Ltd.).

A specific amount of lubricant is preferably added in view of thickness accuracy and mechanical strengths of the stretched film of lactic acid-based polymer.

Exemplary lubricants which can be used include, erucamide, stearamide, oleamide, lauramide, palmitamide, behenamide, ricinolamide, oxystearamide, methylenebisstearamide, ethylenebisstearamide, ethylenebisbehenamide and other aliphatic amide-based lubricants; montan wax, partially saponified ester of montan wax, butyl stearate and other long chain ester waxes; glycerol fatty acid ester, triglyceryl hydroxystearate, aliphatic acid sorbitane ester, and other fatty acid ester-based lubricants; lead stearate, calcium stearate, calcium hydroxystearate, and other metal soap-based lubricants which are aliphatic acid metal salts having 12 to 30 carbon atoms; and complex lubricants obtained by combination of these lubricants. In these lubricants, erucamide, montan wax and calcium hydroxystearate are preferred.

The amount of lubricant is preferably 0.1 to 2 parts by weight for 100 parts by weight of the lactic acid-based polymer. When the amount of addition is less than 0.1 part by weight, the stretched film obtained unfavorably lowers imp roving grade of thickness accuracy.

On the other hand, amount exceeding 2 parts by weight decreases processing ability of the film, lowers evenness and thickness accuracy of the film obtained and results in reduction of mechanical strengths of the film.

No particular restriction is imposed upon the procedures for adding and mixing inorganic fillers and lubricants to the lactic acid-based polymer in the invention. Known mixing method can be employed. For example, inorganic fillers and lubricants, when necessary, are added to the lactic acid-based polymer, mixed with a ribbon blender, tumbling mixer or Henschel mixer, and melt-kneaded at temperature of 150° to 230° C. with a Banbury mixer, single screw extruder or twin screw extruder to obtain a composition in the form of a strand, pellet or powder. Antioxidants, antistatic agents and ultraviolet absorbers can be added, when necessary, to the stretched film of the lactic acid-based polymer in the invention.

The stretched film of the lactic acid-based polymer in the invention can be prepared by processing the above obtained lactic acid-based polymer composition into an unstretched film with, for example, an extruder which installs a T-die or circular die and stretching the resultant film through a successive biaxial stretching method composed of roll stretching and tenter stretching, a simultaneous biaxial stretching method by way of tenter stretching, and biaxial stretching method using tubular stretching. The successive biaxial stretching method composed of roll stretching and tenter stretching is preferably used in view of the evenness, thickness accuracy and productivity of the film obtained.

For example, stretched film preparation by the successive biaxial stretching method composed of roll stretching and tenter stretching is carryied out as follows. The above lactic acid-based polymer composition is subjected to drying and crystallization by heat-treating at a temperature of 50° to 130° C. The composition is melt-extruded through a T-die mounted extruder at 130° to 250° C. and quenched on a casting roll at 60° C. or less to form a film. In such case, in order to improve evenness by adhesion of a molten film to the roll, an airknife or electrostatic application is preferably used. Successively, the film obtained is passed through a take-off mechanism and longitudinally stretched 1.3 to 5 times, preferably 2 to 4 times at 30° to 80° C. with a longitudinally stretching device, and thereafter transversely stretched 1.3 to 5 times, preferably 2 to 4 times at 40° to 80° C. with a tenter. When heat resistance (heat-shrink resistance) is required for the film, it is preferred to successively heat set the film under tension at 80° to 150° C. for 3 to 120 seconds in the tenter.

When the stretching magnification is respectively less than 1.3 times in each direction, satisfactory mechanical strengths and durability which are the object of the invention cannot be obtained. On the other hand, a stretching magnification exceeding 5 times leads to unfavorable film breakage. When the stretching temperature is lower than the above range, the film cannot be stretched and causes rupture. A temperature higher than the above range causes crystallization and unfarvorably leads to irregular stretching and breakage of the film.

The stretched film of lactic acid-based polymer in the invention has a thickness of usually 0.01 to 2 mm which is arbitrarily selected depending upon uses.

The stretched film of lactic acid-based polymer in the invention is characterized by excellent durability. The film has a folding endurance, a durability indication, of 900 times or more and also has a thickness accuracy of 3% or less as a variation coefficient of thickness. Further, simultaneous use of the inorganic filler and lubricant improves thickness accuracy and durability of the film and variation coefficient of film thickness becomes 1.3% or less. Consequently, the stretched film is preferably applied in particular to uses which require durability and thickness accuracy. Representative uses include prepaid cards having a magnetic layer. In the case, a variation coefficient exceeding 5% in the thickness of a stretched film gives adverse effect on the adhesive properties, printability and mechanical properties of the magnetic layer. Folding endurance is desirably 900 times or more in view of practical use conditions such as mechanical properties and durability of the prepaid cards. In the case of using the stretched film for a material of prepaid cards, the film preferably has an average thickness of 0.1–0.5 mm. The stretched film of the lactic acid-based polymer in the invention can satisfy any of these properties.

Other uses of the stretched film of the lactic acid-based polymer in the invention include, for example, materials of cards such as a credit card, cash card and membership card. In such cases, preferred thickness of the card is about 0.5 to 2 mm.

The variation coefficient of film thickness and folding endurance in the invention are measured by the method shown in the examples described below.

EXAMPLE

The present invention will hereinafter be illustrated further in detail by way of examples. Properties shown in Preparation Examples and Examples were measured by the methods described below.

1) Weight Average Molecular Weight of the Polymer

Measured by gel permeation chromatography under following conditions using polystyrene as a standard.

Apparatus: LC-10AD (manufactured by Shimadzu Seisakusho Co.)

Detector: RID-6A (manufactured by Shimadzu Seisakusho Co.

Column: GL-S350DT-5, GL-S370DT-5 (manufactured by Hitachi Chemical Co.)

Solvent: Chloroform

Polymer solution concentration: 1% by weight

Injection amount: 20 µl

Flow rate: 1.0 ml/min

2) Average Particle Size of Inorganic Filler 1 g of a sample was added to 100 ml of water and the dispersion was prepared by dispersing the sample in the water using ultrasonic waves for 60 seconds. Some milliliters of the dispersion were quickly sampled by pipette under stirring and put into the sample chamber of particle size analyzer to measure average particle size.

Particle size analyzer: laser diffraction scattering particle size analyzer

Model: Microtrac HRA-UPA100 (manufactured by Honeywell Inc.) (applied to measurement of average particle size of less than 5 µm)

Microtrac HRA-X100 (manufactured by Honeywell Inc.) (applied to measurement of average particle size of 5 µm or more)

3) Stretching Ability

In preparing 1000 m of the stretched film having a width of 1500 mm, the sample in the stretching operation is visually observed and evaluated as follows on the basis of the presence or absence of breakage.

◯: Good stretching ability No generation of breakage in the film stretching operation X: Poor stretching ability Film breakage occurred in the film stretching operation 4) Variation Coefficient of Thickness (%)

Measuring point: A stretched film having width of 1500 mm was used for the specimen. Film thickness was measured at 30 points with an interval of 50 mm in the direction of width. Similar measurements were repeated 10 times with an interval of 100 mm to the direction of film length, and thickness measurements were carried out at 300 points in total. The mean value (X) and standard deviation (δ) were obtained from the data measured. Variation coefficient of thickness (CV) was calculated from the following equation.

$$CV(\%) = (\delta/X) \times 100$$

Measuring device: Digimatic micrometer DMS-250DM (manufactured by Mitutoyo Co.)

5) Tensile Strength (MPa)

Measured on the longitudinal and transverse directions of the specimen in accordance with JIS C-2318.

6) Folding Endurance (The Number of Reflections)

The number of folding cycles were measured in a specimen having a thickness of 200 μm in accordance with JIS P-8115.

PREPARATION EXAMPLE 1

In a thick walled cylindrical stainless steel polymerization vessel equipped with a stirrer, 216 g (1.5 mols) of L-lactide, 0.01% by weight of stannous octoate, and 0.03% by weight of lauryl alcohol were sealed, deaerated under vacuum for 2 hours and successively substituted with nitrogen gas. The mixture was heated with stirring at 200° C. for 3 hours in a nitrogen atmosphere. While maintaining the temperature as intact, the reaction vessel was gradually deaerated by way of a vent and glass receiver with a vacuum pump to evacuate the reaction vessel to 3 mmHg. After an hour from the initiation of deaeration, distillation of monomers and low molecular weight volatiles was ceased. The reaction vessel was substituted with nitrogen gas and the polymer was discharged from the bottom of the reaction vessel in the form of a strand and cut into pellet to obtain poly-L-lactic acid. The polymer had a weight average molecular weight of about 100,000. Polylactic acid obtained in Preparation Example 1 will hereinafter be referred to as lactic acid-based polymer A.

PREPARATION EXAMPLE 2

In a 100 liter reactor equipped with a Dean-Stark trap, 10 kg of 90% by weight L-lactic acid was heated with stirring at 150° C./50 mmHg for 3 hours while distilling out water, successively 6.2 g of tin powder was added, and further stirred for 2 hours at 150° C./3 mmHg to obtain an oligomer. To the oligomer, 28.8 g of tin powder and 21.1 kg of diphenyl ether was added and an azeotropic dehydration reaction was carried out at 150° C./35 mmHg. Distilled water and solvent were separated in a water separator and the solvent alone was returned to the reaction vessel. After 2 hours, the reaction apparatus was reassembled so as to return the organic solvent to the reaction vessel after passing through a column packed with 4.6 kg of molecular sieve 3A. The reaction was further continued at 150° C./35 mmHg for 40 hours to obtain a polylactic acid solution having a weight average molecular weight of 110,000. To the solution, 44 kg of anhydrous diphenyl ether was added and cooled to 40° C. Precipitated crystals were filtered, washed 3 times each with 10 kg of n-hexane, and dried at 60° C./5 mmHg. The powder thus obtained was mixed with 12 kg of 0.5 N-hydrochloric acid and 12 kg of ethanol, stirred at 35° C. for an hour, filtered and dried at 60° C./50 mmHg. Polylactic acid powder thus obtained was 6.1 kg (85% yield) and had an average particle size of 30 μm and a weight average molecular weight of about 110,000. Polylactic acid obtained in Preparation Example 2 will hereinafter be referred to as lactic acid-based polymer B.

PREPARATION EXAMPLE 3

Poly-DL-lactic acid was prepared from 9.2 kg of 98 mol % DL-lactic acid by carrying out the same procedures as Preparation Example 2, and pelletized. The polymer had a weight average molecular weight of about 100,000. Polylactic acid obtained in Preparation Example 3 will hereinafter be referred to as lactic acid-based polymer C.

PREPARATION EXAMPLE 4

A copolymer of lactic acid and glycolic acid was obtained by carrying out the same procedures as Preparation Example 2 except that 10.0 kg of L-lactic acid is replaced by 9.0 kg of L-lactic acid and 1.0 kg of glycolic acid. The copolymer obtained had a weight average molecular weight of about 100,000. The copolymer obtained in Preparation Example 4 will hereinafter be referred to as lactic acid-based polymer D.

EXAMPLE 1

To 100 parts by weight of lactic acid-based polymer obtained in Preparation Example 1, 5 parts by weight of barium sulfate (BARIUM SULFATE precipitated ST manufactured by Barium Chemical Co. Ltd.) was added, mixed with a ribbon blender, melt kneaded with a twin screw kneading extruder at a cylinder temperature of 170° to 210° C., and pelletized to obtain a lactic acid-based polymer composition. The polymer composition thus obtained was dried at 80° C. in an oven, heat treated, crystallized the polymer, extruded with a T-die mounted single screw extruder at temperature of 150° to 200° C., and cooled on a casting roll at 35° C. to obtain an unstretched sheet having an average thickness of 1.5 mm. Successively, the sheet thus obtained was longitudinally stretched 2.5 times with a hot roll at 60° C., thereafter transversely stretched 2.5 times with a tenter at 70° C., and further heat-treated under tension in the tenter at temperature of 130° C. for 30 seconds, cooled, and taken up with a wind-up machine to obtain a stretched film having an average thickness of 200 μm. The variation coefficient of thickness, tensile strength and folding endurance of the stretched film obtained were measured by the above methods and results are illustrated in Table 1.

EXAMPLE 2 to 7

To each 100 parts by weight of the lactic acid-base polymer B to D which was obtained in Preparation Examples 2 to 4, respective inorganic filler was individually added in an amount shown in Table 1. Each mixture was treated by the same procedures as carried out in Example 1 to prepare lactic acid-based polymer compositions. The inorganic fillers used were titanium oxide (TIPAQUE CR60-2, manufactured by Ishihara Sangyo Co., Ltd.), silica (SYLYSIA, manufactured by Fuji Silysia Chemical Ltd.), calcium carbonate (ACE-25, manufactured by Dowa Calfine Co. Ltd.), kaolin (NN KAOLIN CLAY, manufactured by Tsuchiya Kaolin Industry Ltd.) and talc (LMS-200, manufactured by Fuji Talc Industrial Co. Ltd.). By using the lactic acid-based polymer compositions thus obtained, stretched films were prepared by the same procedures as Example 1 with stretching magnifications shown in Table 1.

The tensile strength and folding endurance of the stretched film obtained were measured by the above method and results are shown in Table 1.

EXAMPLES 8 to 16

To each 100 parts by weight of the lactic acid-based polymer A to D which was obtained in Preparetion Examples 1 to 4, respective inorganic filler and lubricant were individually added in an amount shown in Table 1. Each mixture was treated by the same procedures as carried out in Example 1 to prepare lactic acid-based polymer compositions. The lubricants used were montan wax (Hostalub WE-4, manufactured by Hochst industry Co. Ltd.), erucamide (DIAMIDE L-200, manufactured by Nippon Kasei Cemical Co. Ltd.) and calcium hydroxystearate (CS-6, manufactured by Kawaken Finechemical Co. Ltd.).

The inorganic fillers used were titanium oxide (TIPAQUE CR58-2, manufactured by Ishihara Sangyo Co., Ltd.), silica (SYLYSIA, manufactured by Fuji Silysia Chemical Ltd.), calcium carbonate (NCC#45, manufactured by Nitto Funka Kogyo KK), kaolin (NN KAOLIN CLAY, manufactured by Tsuchiya Kaolin Industry Ltd.) and talc (PKP-80, manufactured by Fuji Talc Industrial Co. Ltd.). By using the lactic acid-based polymer compositions thus obtained, stretched films were prepared by the same procedures as Example 1 with stretching magnifications shown in Table 1. The tensile strength and folding endurance of the stretched film obtained were measured by the above method and results are illustrated in Table 1.

TABLE 1

| | Example 1 | Example 2 | Example 3 | Example 4 | Example 5 | Example 6 |
|---|---|---|---|---|---|---|
| Polymer (100 parts by weight) | A | B | C | D | B | B |
| Filler | barium sulfate | titanium oxide | silica | calcium carbonate | kaolin | talc |
| (parts by weight) | 5 | 10 | 15 | 20 | 23 | 10 |
| (particle size, μm) | 0.85 | 0.21 | 5 | 1.5 | 3.5 | 1.65 |
| Stretchinq Ratio (times) | | | | | | |
| longitudinal | 2.5 | 3 | 1.5 | 3.5 | 2 | 2 |
| transverse | 2.5 | 3 | 1.5 | 3.5 | 3 | 2 |
| Lubricant | — | — | — | — | — | — |
| (parts by weight) | | | | | | |
| Stretching Ability | ○ | ○ | ○ | ○ | ○ | ○ |
| Variation Coefficient of Thickness | 1.5 | 1 | 2 | 2.5 | 2.5 | 1.5 |
| Tensile Strength (MPa) | | | | | | |
| longitudinal | 90 | 105 | 85 | 90 | 90 | 95 |
| transverse | 88 | 101 | 86 | 92 | 99 | 93 |
| Folding Endurance (the number of reflections) | 1100 | 1800 | 1000 | 1200 | 1400 | 1400 |

| | Example 7 | Example 8 | Example 9 | Example 10 | Example 11 | Example 12 |
|---|---|---|---|---|---|---|
| Polymer (100 parts by weight) | B | B | B | B. | B | A |
| Filler | titanium oxide | titanium oxide | titanium oxide | titanium oxide | titanium oxide | barium sulfate |
| (parts by weight) | 15 | 10 | 10 | 10 | 10 | 10 |
| (particle size, μm) | 0.21 | 0.21 | 0.3 | 0.21 | 0.21 | 1.5 |
| Stretching Ratio (times) | | | | | | |
| longitudinal | 3 | 3 | 3 | 3 | 3 | 2.5 |
| transverse | 3 | 3 | 3 | 3 | 3 | 2.5 |
| Lubricant | — | erucamide | montan wax | montan wax | calcium hydroxy-stearate | montan wax |
| (parts by weight) | | 1 | 0.2 | 0.2 | 1.5 | 0.2 |
| Stretching Ability | ○ | ○ | ○ | ○ | ○ | ○ |
| Variation Coefficient of Thickness | 0.5 | 0.45 | 0.4 | 0.4 | 0.45 | 0.8 |
| Tensile Strength (MPa) | | | | | | |
| longitudinal | 110 | 111 | 112 | 115 | 11o | 95 |
| transverse | 105 | 108 | 110 | 112 | 105 | 93 |
| Folding Endurance (the number of reflections) | 2100 | 2200 | 2300 | 2400 | 2100 | 1400 |

| | Example 13 | Example 14 | Example 15 | Example 16 |
|---|---|---|---|---|
| Polymer (100 parts by weight) | B | C | D | B |
| Filler | talc | silica | calcium | kaolin |

TABLE 1-continued

|  |  |  | carbonate |  |
|---|---|---|---|---|
| (parts by weight) | 10 | 10 | 10 | 10 |
| (particle size, μm) | 8 | 10 | 4 | 8 |
| Stretching Ratio (times) |  |  |  |  |
| longitudinal | 2.5 | 2.5 | 2.5 | 2.5 |
| transverse | 2.5 | 2.5 | 2.5 | 2.5 |
| Lubricant | montan wax | montan wax | montan wax | montan wax |
| (parts by weight) | 0.2 | 0.2 | 0.2 | 0.2 |
| Stretching Ability | ○ | ○ | ○ | ○ |
| Variation Coefficient of Thickness | 0.8 | 1.0 | 1.2 | 1.2 |
| Tensile Strength (MPa) |  |  |  |  |
| longitudinal | 96 | 86 | 92 | 95 |
| transverse | 94 | 88 | 95 | 99 |
| Folding Endurance (the number of reflections) | 1500 | 1100 | 1300 | 1600 |

COMPARATIVE EXAMPLES 1 to 4

To each 100 parts by weight of the lactic acid-based polymer A and B which was obtained in Preparation Examples 1 to 2, respective inorganic filler was individually added in an amount shown in Table 2.

Each mixture was treated by the same procedures as carried out in Example 1 to prepare lactic acid-based polymer compositions. The inorganic fillers used were zinc oxide (EP, manufactured by Mitsui Mining & Smelting Co., Ltd.), magnesium oxide (KYOWAMAG150, manufactured by Kyowa Chemical Industry Co., Ltd.) and titanium oxide (TIPAQUE CR60-2, manufactured by Ishihara Sangyo Co., Ltd.). By using the lactic acid-based polymer compositions thus obtained, stretched films were prepared by the same procedures as Example 1 with stretching magnifications shown in Table 1. The tensile strength and folding endurance of the stretched film obtained were measured by the above method and results are illustrated in Table 2.

COMPARATIVE EXAMPLES 5 to 14

To each 100 parts by weight of the lactic acid-based polymer A to D which was obtained in Preparation Examples 1 to 4, respective inorganic filler and lubricant were individually added in an amount shown in Table 2. Each mixture was treated by the same procedures as carried out in Example 1 to prepare lactic acid-based polymer compositions. The inorganic fillers used were titanium oxide (TTO-55 and TIPAQUE CR60-2, manufactured by Ishihara Sangyo Co., Ltd.), barium sulfate (BARIFINE BF-10 and BARIUM SULFATE precipitated SP, manufactured by Sakai Chemical Industry Co., Ltd.), silica (SYLYSIA470, manufactured by Fuji Silysia Chemical Ltd.), calcium carbonate (SS#30, manufactured by Nitto Funka Kogyo KK), kaolin (NN KAOLIN CLAY, manufactured by Tsuchiya Kaolin Industry Ltd.) and talc (LMS-300 and NK-48, manufactured by Fuji Talc Industrial Co. Ltd.). By using the lactic acid-based polymer compositions thus obtained, stretched films were prepared by the same procedures as Example 1 with stretching magnifications shown in Table 2. The tensile strength and folding endurance of the stretched film obtained were measured by the above method and results are illustrated in Table 2.

COMPARATIVE EXAMPLE 15

To the lactic acid-based polymer powder B which was obtained in Preparation Example 2, titanium oxide (TIPAQUE CR60-2, manufactured by Ishihara Sangyo Co., Ltd.) was added in an amount shown in Table 2. The mixture was melt-extruded with a twin screw kneading extruder at cylinder temperature of 170° to 210° C. and pelletized. The pellet thus obtained was dried and heat-treated in an oven. After crystallizing the polymer, the pellet was extruded with a T-die mounted single screw extruder at temperature of 150° to 200° C. and cooled on a casting roll at 35° C. to obtain an unstretched film having an average thickness of 200 μm. The tensile strength and folding endurance of the unstretched film obtained were measured by the above method and results are illustrated in Table 2.

TABLE 2

|  | Comp. Ex 1 | Comp. Ex 2 | Comp. Ex 3 | Comp. Ex 4 | Comp. Ex 5 | Comp. Ex 6 |
|---|---|---|---|---|---|---|
| Polymer (100 parts by weight) | A | B | B | B | B | B |
| Filler | zinc oxide | magnesium oxide | titanium oxide | titanium oxide | titanium oxide | titanium oxide |
| (parts by weight) | 5 | 10 | 2 | 30 | 10 | 10 |
| (particle size, μm) | 0.3 | 4 | 0.21 | 0.21 | 0.06 | 0.21 |
| Stretching Ratio (times) |  |  |  |  |  |  |
| longitudinal | 2.5 | 3 | 3 | 2.5 | 3 | 7 |
| transverse | 2.5 | 3 | 3 | 2.5 | 3 | 7 |
| Lubricant | — | — | — | — | montan wax | montan wax |
| (parts by weight) |  |  |  |  | 0.2 | 0.2 |
| Stretching Ability | x | x | ○ | x | ○ | x |
| Variation Coefficient of | 6 | 7.5 | 2.5 | 6.5 | 2.5 | * |

TABLE 2-continued

| Thickness<br>Tensile Strength (MPa) | | | | | |
|---|---|---|---|---|---|
| longitudinal | 55 | 45 | 65 | 72 | 68 |
| transverse | 48 | 40 | 62 | 65 | 64 |
| Folding Endurance<br>(the number of reflections) | 180 | 120 | 400 | 600 | 600 |

| | Comp. Ex 7 | Comp. Ex 8 | Comp. Ex 9 | Comp. Ex 10 | Comp. Ex 11 | Comp. Ex 12 |
|---|---|---|---|---|---|---|
| Polymer<br>(100 parts by weight) | B | A | A | B | B | C |
| Filler | titanium oxide | barium sulfate | barium sulfate | talc | talc | silica |
| (parts by weight) | 10 | 5 | 5 | 10 | 10 | 10 |
| (particle size, μm) | 0.21 | 0.06 | 3 | 0.06 | 12 | 14 |
| Stretching Ratio (times) | | | | | | |
| longitudinal | 3 | 2.5 | 2.5 | 2 | 2 | 2.5 |
| transverse | 3 | 2.5 | 2.5 | 2 | 2 | 2.5 |
| Lubricant | montan wax | montan wax | montan wax | montan wax | montan wax | montan wax |
| (parts by weight) | 2.5 | 0.2 | 0.2 | 0.2 | 0.2 | 0.2 |
| Stretching Ability | × | ○ | × | ○ | × | × |
| Variation Coefficient of Thickness | 8 | 2.5 | 7.5 | 1.5 | 6.5 | 7.5 |
| Tensile Strength (MPa) | | | | | | |
| longitudinal | 50 | 63 | 65 | 76 | 78 | 60 |
| transverse | 50 | 60 | 62 | 73 | 75 | 55 |
| Folding Endurance<br>(the number of reflections) | 400 | 600 | 600 | 700 | 800 | 400 |

| | Comp. Ex 13 | Comp. Ex 14 | Comp. Ex 15 |
|---|---|---|---|
| Polymer<br>(100 parts by weight) | D | B | B |
| Filler | calcium carbonate | kaolin | titanium oxide |
| (parts by weight) | 10 | 10 | 10 |
| (particle size, μm) | 8 | 12 | 0.21 |
| Stretching Ratio (times) | | | |
| longitudinal | 2.5 | 2.5 | — |
| transverse | 2.5 | 2.5 | — |
| Lubricant | montan wax | montan wax | montan wax |
| (parts by weight) | 0.2 | 0.2 | 0.2 |
| Stretching Ability | × | × | —* |
| Variation Coefficient of Thickness | 7 | 7.5 | 1.5 |
| Tensile Strength (MPa) | | | |
| longitudinal | 75 | 65 | 52 |
| transverse | 70 | 64 | 52 |
| Folding Endurance<br>(the number of reflections) | 500 | 600 | 200 |

*When stretching, film was torn.

What is claimed is:

1. A stretched film of a polylactic acid or a copolymer of lactic acid and other aliphatic hydroxycarboxylic acid comprising 3 to 25 parts by weight of one or more inorganic fillers selected from the group consisting of titanium oxide having an average particle size of 0.1 to 0.5 μm, calcium carbonate having an average particle size of 0.3 to 6 μm, barium sulfate having an average particle size of 0.1 to 2 μm, silica having an average particle size of 1 to 12 μm, kaolin having an average particle size of 0.5 to 10 μm, and talc having an average particle size of 0.1 to 10 μm, and 0.1 to 2 parts by weight of a lubricant for 100 parts by weight of polylactic acid or a copolymer of lactic acid and other aliphatic hydroxycarboxylic acid, and being stretched 1.3 to 5 times to one or more axial directions.

2. The stretched film of a polylactic acid or a copolymer of lactic acid and other aliphatic hydroxycarboxylic acid according to claim 1 wherein the film thickness is from 0.01 to 2 mm.

3. The stretched film of a polylactic acid or a copolymer of lactic acid and other aliphatic hydroxycarboxylic acid according to claim 1 wherein the inorganic filler is titanium oxide having an average particle size of from 0.1 to 0.5 μm.

4. A material for prepaid card, said material comprising the stretched film of a polylactic acid or a copolymer of lactic acid and other aliphatic hydroxycarboxylic acid having a film thickness of from 0.1 to 0.5 mm according to claim 3.

5. The stretched film of a polylactic acid or a copolymer of lactic acid and other aliphatic hydroxycarboxylic acid according to claim 1 wherein folding endurance is at least 900 times.

6. A material for prepaid card, said material comprising the stretched film of a polylactic acid or a copolymer of lactic acid and other aliphatic hydroxycarboxylic acid having a film thickness of from 0.1 to 0.5 mm according to claim 5.

7. The stretched film of a polylactic acid or a copolymer of lactic acid and other aliphatic hydroxycarboxylic acid according to claim 1 wherein the lubricant is one or more compounds selected from the group consisting of aliphatic amides, aliphiatic esters and metallic soaps.

8. A material for prepaid card, said material comprising the stretched film of a polylactic acid or a copolymer of lactic acid and other aliphatic hydroxycarboxylic acid having a film thickness of from 0.1 to 0.5 mm according to claim 7.

9. The stretched film of a polylactic acid or a copolymer of lactic acid and other aliphatic hydroxycarboxylic acid according to claim 1 wherein the film has a thickness of from 0.01 to 2 mm, variation coefficient of thickness of not more than 1.3%, and folding endurance of at least 900 times.

10. The stretched film of a polylactic acid or a copolymer of lactic acid and other aliphatic hydroxycarboxylic acid according to claim 9 wherein the inorganic filler is titanium oxide having an average particle size of from 0.1 to 0.5 µm.

11. A material for prepaid card, said material comprising the stretched film of a polylactic acid or a copolymer of lactic acid and other aliphatic hydroxycarboxylic acid having a film thickness of from 0.1 to 0.5 mm according to claim 10.

12. A material for prepaid card, said material comprising the stretched film of a polylactic acid or a copolymer of lactic acid and other aliphatic hydroxycarboxylic acid having a film thickness of from 0.1 to 0.5 mm according to claim 9.

13. A material for prepaid card, said material comprising the stretched film of a polylactic acid or a copolymer of lactic acid and other aliphatic hydroxycarboxylic acid having a film thickness of from 0.1 to 0.5 mm according to claim 1.

* * * * *